(No Model.)
J. J. MARTIN & W. H. BROWNFIELD.
LUBRICATOR.
No. 482,559. Patented Sept. 13, 1892.
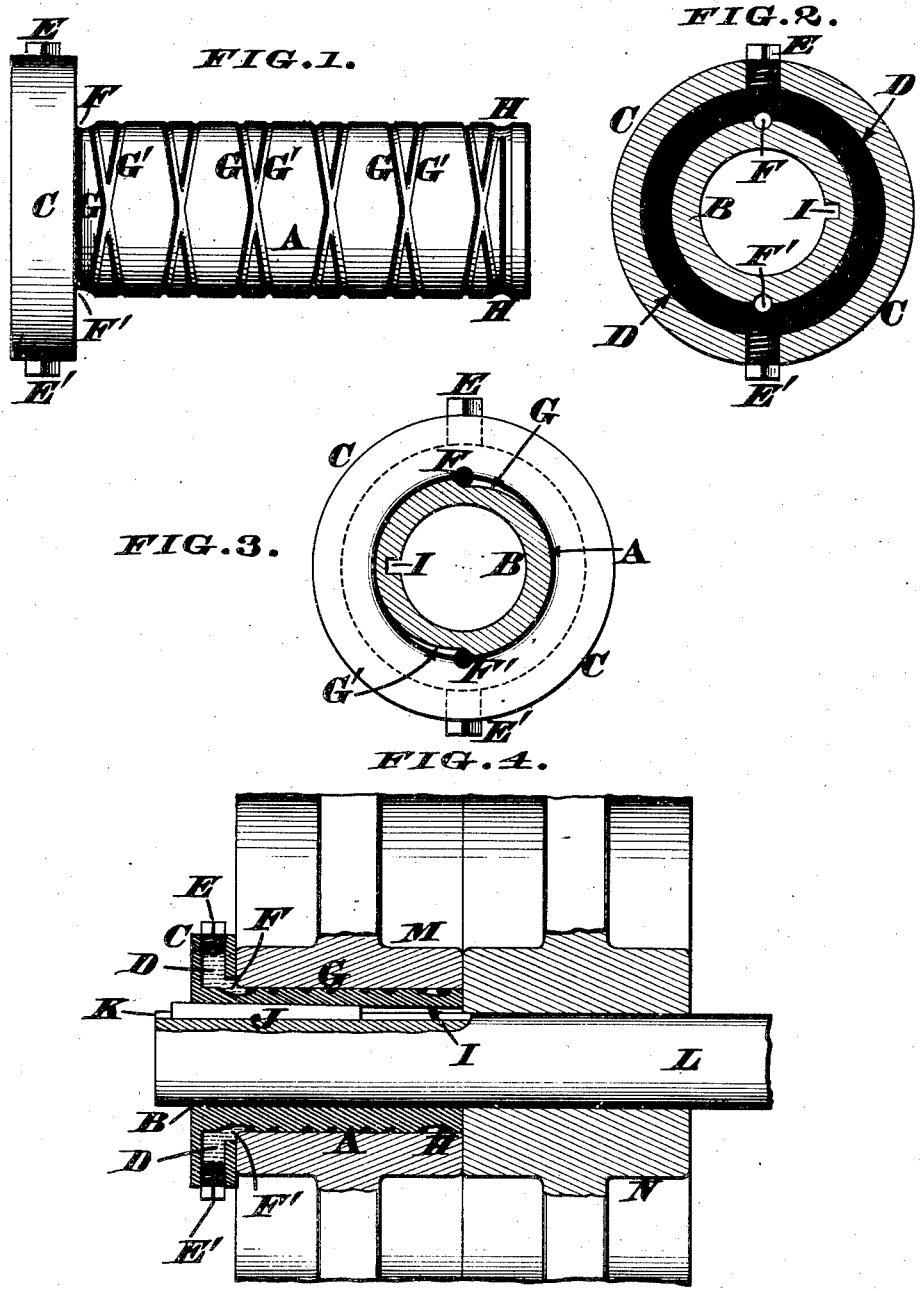

UNITED STATES PATENT OFFICE.

JOSEPH J. MARTIN, OF BELLEVUE, AND WILLIAM H. BROWNFIELD, OF DAYTON, ASSIGNORS OF ONE-THIRD TO LOUIS K. MARTY, OF NEWPORT, KENTUCKY.

LUBRICATOR.

SPECIFICATION forming part of Letters Patent No. 482,559, dated September 13, 1892.

Application filed April 9, 1892. Serial No. 428,443. (No model.)

*To all whom it may concern:*

Be it known that we, JOSEPH J. MARTIN, residing at Bellevue, and WILLIAM H. BROWNFIELD, residing at Dayton, in the county of Campbell and State of Kentucky, citizens of the United States, have invented a certain new and useful Loose-Pulley Journal; and we do hereby declare the following to be a full, clear, and exact description of the invention, reference being had to the annexed drawings, which form part of this specification.

Our invention comprises a specific construction of journal to be inserted between a loose pulley and a shaft that carries the latter, the journal being fixed with reference to the shaft and being so arranged as to deliver a constant and automatic supply of lubricant within the hub of the loose pulley, as hereinafter more fully described.

In the annexed drawings, Figure 1 is a side elevation of our loose-pulley journal. Fig. 2 is a vertical section of the journal-head, taken in the plane of its screw-plugs. Fig. 3 is a vertical section of the journal, taken immediately in the rear of its head. Fig. 4 is a sectionized elevation showing a fast-and-loose pulley mounted upon a shaft and our journal applied to the loose pulley.

The principal portion of our journal is a cylindrical tube A, preferably of cast metal, and having a bore B of such a diameter as to fit snugly around a shaft, one end of said tube being provided with an enlargement or head C, having an annular chamber D to contain oil or other lubricant, the chamber being readily filled after either of the screw-plugs E or E' is disengaged. Communicating with this chamber are ports F F', that open into grooves G G', running around the exterior of the tube. Furthermore, these grooves are helices and are so arranged as to run in opposite directions; or, in other words, they are right and left hand and meet at one end in a special groove H, passing circumferentially around said tube. In most cases the bore of the tube is grooved longitudinally at I to admit a key J, capable of being inserted within said groove, and also within the groove K of shaft L, although said tube may be attached to said shaft by a set-screw or otherwise.

M in Fig. 4 is the hub of a loose pulley, and N the hub of a fast pulley.

In fitting up our journal the hub N of the fast pulley is first keyed or otherwise secured upon the shaft L, and then the loose-pulley hub M is slipped upon the tube A. The latter is now applied to the shaft and is advanced until the pair of hubs abut against each other, as seen in Fig. 4, and after this act is accomplished the key J is driven into the coincident grooves I and K, thereby securely uniting said tube and shaft, the head C serving as a collar that holds the loose pulley in place. Screw-plug E or E' is next disengaged and the chamber D filled with oil, and then said plug is reinserted before the shaft is set in motion, any turning of the loose pulley being sufficient to induce a free flow of the lubricant. The direction of the flow will depend on the way the pulley is turned, whether to the right or left; but in either event the oil will be drawn along one of the helical grooves until it reaches the end groove H, and then the lubricant will be forced back along the other helical groove and again enter the chamber D. Consequently whenever the loose pulley is in motion there is an automatic drawing of oil from the chamber D to the opposite end of the tube and then a return of the lubricant to said chamber, and as this flow is constant and uniform the journal requires no attention, except to charge said reservoir at rare intervals. We prefer to make the parts A C of a single integral casting, because we believe better results can be accomplished by running the pulley-hub on cast-iron than by letting it come in contact with a wrought shaft; but these parts A C can be of wrought metal, if desired.

We claim as our invention—

The within-described specific construction of loose-pulley journal, which construction includes the cylindrical tube A, having a central bore B and at one end a head C, provided with a continuous annular chamber D, and a filling-hole closed by a stopper E, said chamber being furnished with a pair of ports F F', about in line with the outer periphery of said tube, a series of reverse helical grooves G G' being made externally of said tube and a circumferential groove H being formed in it near the end remote from said head C, the grooves G G' being in communication both with said ports F F' and the groove H, all as herein set forth, and for the purpose explained.

In testimony whereof we affix our signatures in presence of two witnesses.

JOSEPH J. MARTIN.
WILLIAM H. BROWNFIELD.

Witnesses:
JAMES H. LAYMAN,
ALFRED M. DAVIS.